June 6, 1967   G. C. MEIBUHR   3,323,816
SHAFT COLLAR ASSEMBLY
Filed May 21, 1963   3 Sheets-Sheet 1

INVENTOR.
GEORGE C. MEIBUHR
BY
Woodling, Krost, Granger & Rust
atty's.

INVENTOR.
GEORGE C. MEIBUHR
BY
Woodling, Krost, Granger & Rust
attys.

INVENTOR.
GEORGE C. MEIBUHR
BY
Woodling, Krost, Granger & Rust
attys.

United States Patent Office 3,323,816
Patented June 6, 1967

3,323,816
SHAFT COLLAR ASSEMBLY
George C. Meibuhr, 8325 Midland Road,
Mentor, Ohio 44060
Filed May 21, 1963, Ser. No. 285,185
3 Claims. (Cl. 287—52.07)

This application is a continuation-in-part of Ser. No. 169,726, filed Jan. 30, 1962, now abandoned.

The present invention relates in general to shaft collars and more particularly to such constructions which provide a convenient shoulder effect on a shaft.

An object of the present invention is to provide an accurate and reliable means of providing a shoulder on a shaft or the like without the expensive step-turning and plunge grinding that is usually required.

Another object of the present invention is to provide a shaft collar for use with high thrust applications such as for resisting the thrust of tapered roller bearings; spiral, bevel and mitre gears; and cams and other machine elements.

Another object of the present invention is to provide a shaft collar assembly to resist thrust loads which will resist such loads from either or both directions.

Another object of the present invention is to provide a shaft collar assembly which includes at least two arcuate keys and an annular retainer ring for resisting thrust wherein the thrust force is applied to the keys within their diameter.

Another object of the present invention is to provide a shaft collar assembly which includes arcuate key means and retainer ring with the retainer ring terminating short of one side of the key means so a thrust may be exerted in either of two directions on the arcuate key means.

Another object of the present invention is to provide a shaft collar assembly which includes split key means for disposition in a groove in a shaft which have tapered walls opposite the groove and a correspondingly tapered retainer ring which is engageable with a thrust member to preload same applying a compressive load to the arcuate key means to maintain same in the groove.

Another object of the present invention is to provide a shaft collar assembly where the load is applied primarily to the arcuate key means rather than to the retainer so that the retainer is essentially a non-loaded member.

Another object of the present invention is to provide a shaft collar assembly which may be used on the outside of a shaft and a design which may be used on the inside of a shaft.

Other objects and a fuller understanding of this invention may be had by referring to the following description and claims, taken in conjunction with the accompanying drawings, in which:

As mentioned hereinabove, the present invention has to do with a convenient and economical means of providing a shoulder effect on a shaft against which a thrust load may be applied without the necessity of step-turning the material of the shaft as would normally be required and yet still providing a construction which is inherently as strong as a shoulder which is turned on a shaft. This is accomplished while still retaining the disassembly features which enable the shaft to be removed in either direction.

Figure 1:
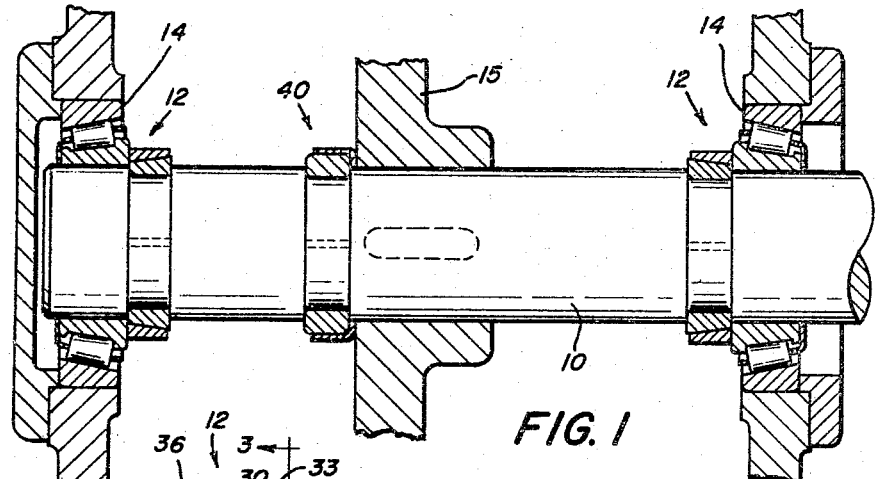
FIGURE 1 is a side elevational view of a shaft with three shaft collar assemblies of the present invention illustrated for use with a gear member and tapered roller bearings.

FIGURE 1 illustrates generally the use of the shaft collar assemblies of the present invention and illustrated in this figure is a shaft 10 to which have been applied two shaft collar assemblies 12 and another shaft collar assembly 40. The shaft collar assemblies 12 are associated with tapered roller bearings 14 and at either end portion of the shaft 10 and at an intermediate portion of the shaft, the shaft collar assembly 40 is shown associated with a gear member 15. The roller bearings and gear member are indicated for the purpose of showing the association of the shaft collar assemblies with a thrust member or a member which must be retained against movement in an axial direction with respect to the shaft. In other words, when a load is applied to the gear member 15 (FIGURE 1) the force exerted is in an axial direction to the left, and some means must be provided to prevent the tendency of the gear member to move in this axial direction. The thrust force exerted by the roller bearings 14 on the left would be to the right.

Figure 2:
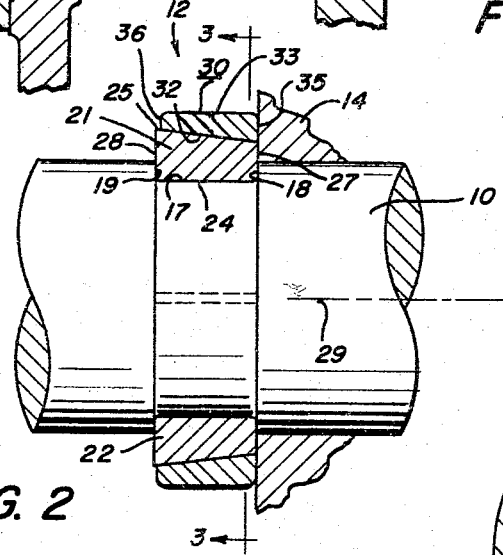
FIGURE 2 is an enlarged view of one of the shaft collar assemblies shown in FIGURE 1.
Figure 3:
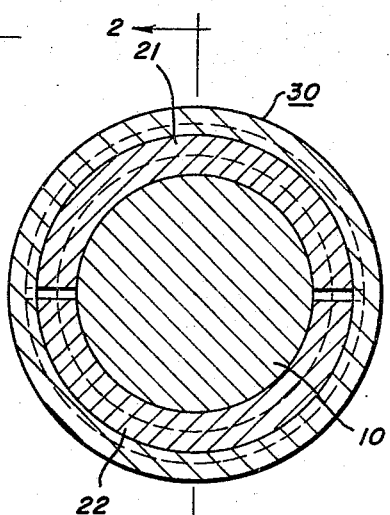
FIGURE 3 is a view taken generally along the line 3—3 of FIGURE 2.

FIGURES 2 and 3 illustrate the details of the shaft collar assemblies 12 which are shown in FIGURE 1. The shaft 10 as seen in FIGURE 2 is provided with wall means which define a generally rectangularly shaped groove which extends annularly around the outside of the shaft. This groove includes a bottom wall 17 and first and second side walls 18 and 19 respectively. Residing in the groove are first and second arcuate keys 21 and 22 respectively and each of these arcuate keys is provided with inner and outer walls 24 and 25 respectively and first and second side walls 27 and 28 respectively As the arcuate keys reside in the groove, the inner walls 24 thereof are located adjacent the bottom wall 17 of the groove and the first and second side walls 27 and 28 of the split keys reside respectively adjacent the first and second side walls 18 and 19 of the groove.

As noted from FIGURES 2 and 3, the first and second side walls 27 and 28 of the arcuate keys 21 and 22 extend from the groove and radially beyond the outer surface of the shaft. The outer wall 25 of each of the arcuate keys extends between the first and second side walls 27 and 28 on what may be referred to as a taper and in the form of the invention shown in FIGURES 2 and 3, this wall forms the surface of, or at least a part of the surface of a cone whose axis in the assembled position of the keys on the shaft coincides with the axis 29 of the shaft.

An integral annular retainer ring 30 is provided which has inner and outer walls 32 and 33 respectively and also first and second side walls 35 and 36 respectively. The inner wall 32 of the retainer ring is on a taper as it extends between the first and second walls 35 and 36 of the retainer ring. This tapered wall corresponds to the outer wall 25 of the arcuate keys 21 and 22. It will be noted in FIGURE 2 that the inner wall 32 of the retainer ring 30 engages the outer wall 25 of the arcuate keys to hold them in assembled condition in the groove. In the completely assembled condition the first side wall 35 of the retainer ring 30 is substantially flush with the first side wall 27 of the first and second split keys 21 and 22. The second side wall 36 of the retainer ring 30 terminates short of the second side wall 28 of the arcuate keys 21 and 22. With this construction, the arcuate keys may be utilized to withstand an axial thrust whether it is exerted against the first side wall 27 of the arcuate keys or on the second side wall 28 of the arcuate keys. To illustrate this point further, in some constructions it might be necessary to have tapered roller bearings such as are shown on opposite ends of the shaft 10 closely adjacent each other and the opposite axial thrusts exerted by these bearings may be counteracted by the use of a single shaft collar assembly 12. In this instance, the thrust of one bearing assembly would be taken by the wall 27 (as shown in FIGURE 2) and the thrust of the other bearing assembly would be taken by the wall 28. With the thrust member such as the bearings 14 not yet completely assembled (FIGURE 4), the first side wall 35 of the retainer ring 30 extends just slightly to the right of the first side wall 27 of the split key members. In other words, upon assembling the gear member into position, the retainer ring is pushed onto the arcuate keys a very small distance until the two side walls 35 and 27 are substantially flush or in alignment. This action in pushing the tapered retainer ring onto the arcuate keys exerts a compressive load on the keys which tends to hold them in groove. The force required for this is relatively low compared to the thrust capacity of the shaft collar assembly in its final position. Since the load imposed by the thrust member is applied directly to the arcuate keys with the minor load being applied to the retainer to hold the keys in the shaft, the assembly has a thrust rating which is essentially the capacity of the arcuate keys in shear. The small horizontal component of force is required to, in effect, push the tapered retainer ring onto the arcuate keys, has an opposite force which is applied to the thrust member which acts as a pre-load thereagainst. It will also be noted that the thrust load which is applied to the shaft collar assembly is applied to these members within the diameter of the keys and as mentioned hereinabove, this force may be exerted against either side of the arcuate keys. It should be appreciated that the annular retainer ring might be of a stamped rather than machined construction without departing from the spirit of the present invention, and if made of a stamped construction, the outer wall 33 would be generally parallel with the inner wall 32. The assembly could of course be made permanent by the use of a locking or non-releasing taper.

Figure 4:
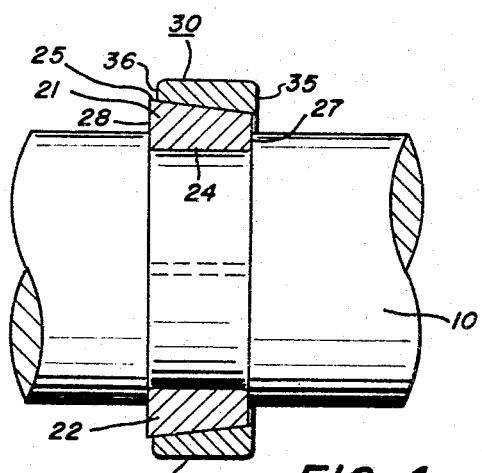
FIGURE 4 is a view similar to FIGURE 2 but with the tapered roller bearings not in place.
Figure 5:
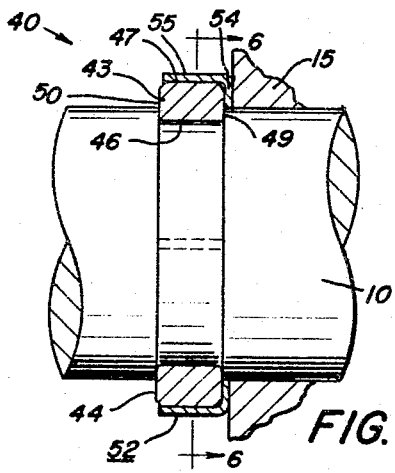
FIGURE 5 is a view similar to FIGURE 2 but illustrating another of the shaft collar assemblies shown in FIGURE 1.
Figure 6:
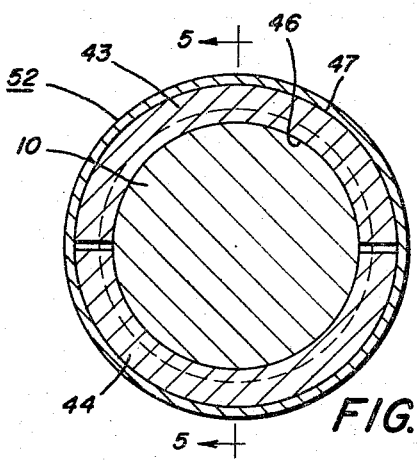
FIGURE 6 is a view taken generally along the line 6—6 of FIGURE 5.

FIGURES 5 and 6 illustrate in more detail the shaft collar assembly 40 located in a groove on shaft 10. This assembly includes first and second arcuate keys 43 and 44 each of which are provided with inner and outer walls 46 and 47 and first and second side walls 49 and 50 respectively. The cross-sectional shape of the arcuate keys 43 and 44 is substantially rectangular in form as shown in FIGURE 4 and the tapered outer wall surface has been omitted from this construction. In this particular construction, an annular retainer ring 52 is provided and this retainer ring is generally cup-shaped in form and is of a stamped construction. The retainer ring 52 is provided with an end wall 54 which abuts the first side wall 49 of the split keys and a retainer wall 55 which generally engages the outer wall 47 of the arcuate keys and which terminates slightly short of the second side wall 50 of each of the arcuate keys. The thrust member 15 indicated only partially, is generally positioned so as to engage the end wall 54 of the retainer ring which in turn transmits the force to the arcuate keys 43 and 44. As in the construction shown in FIGURES 2 and 3, the thrust load may be applied against the second side wall 50 of the arcuate keys. This construction is different from the consrtuction described heretofore, since the pre-load which was discussed is not available in this construction, however, it has the advantage of assuming the same position in loaded or unloaded state. This construction, however, is entirely satisfactory for many installations and provides a valuable contribution to the prior art. In this modification of the invention, the thrust load is resisted by the arcuate keys within their diameter and the load is applied within this diameter. The retainer ring 52 is not a load bearing member and the face, or as otherwise referred to as the end wall 54 is disposed directly between the arcuate keys and the thrust member 15, and the material of the end wall resists the thrust load thereon in compression and merely transmits the thrust load directly to the arcuate keys. The compressive strength of the end wall 54 is infinitely high in comparison with the thrust rating of the shaft collar assembly. In this consrtuction, the assembly may very well be made permanent by incorporating a press fit between the retainer ring and the arcuate keys or by brazing, soldering, or welding the same in place by any well known method, and the assembly may be made releasing where dis-assembly is required or important.

Figure 8:
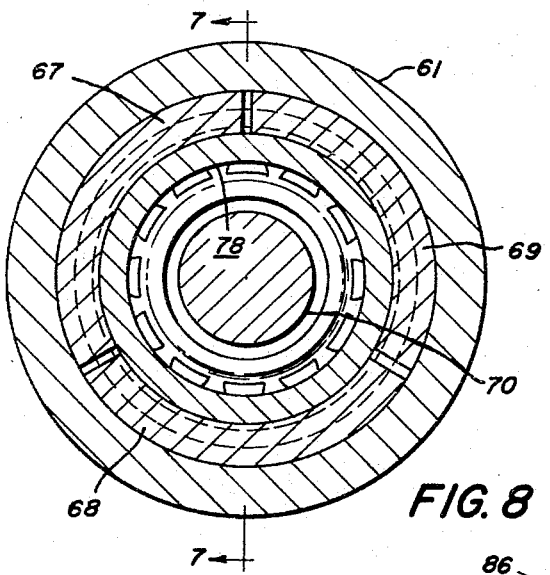
FIGURE 8 is a view taken generally along the line 8—8 of FIGURE 7.
Figure 7:
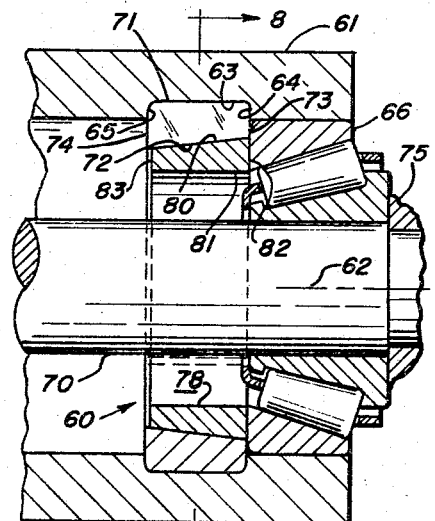
FIGURE 7 is a side elevational view of an internal shaft collar assembly constructed in accordance with the teachings of the present invention.

FIGURES 7 and 8 illustrate a design of a shaft collar assembly 60 for use on the internal surface of a shaft. In this construction, a groove is provided on the inner surface of a shaft 61 and this groove includes a bottom wall 63 and first and second side walls 64 and 65 respectively. Located within the groove are three arcuate keys 67, 68 and 69 respectively, each of which extends substantially 120° with the ends of each of the keys being spaced slightly from each other. Each of the arcuate keys is provided with what may be referred to as inner wall 71 and an outer wall 72, as well as first and second side walls 73 and 74 respectively. The split keys are positioned in the groove so that the inner wall 71 is adjacent the bottom wall 63 and the side walls 73 and 74 are respectively adjacent the side walls 64 and 65. The outer wall 72 is on a taper as it extends between the first and second side walls 73 and 74 and this taper forms at least a portion of the surface of a cone whose axis substantially coincides with the axis 62 of the shaft 61. As indicated in this construction, the arcuate keys are three in number, however, it will be appreciated by those skilled in the art that the number of arcuate keys might vary. In this embodiment the thrust member is a tapered roller bearing 66 which in turn rotatively supports a shaft 70. The axial position of bearing 66 relative to shaft 70 is maintained by member 75 which might be another shaft collar assembly like 12 shown in FIGURE 1.

An annular retainer ring 78 is provided which has inner and outer walls 80 and 81 respectively and first and second side walls 82 and 83 respectively. The inner wall of the retainer ring is also on a taper which corresponds substantially to the taper on the outer wall 72 of the arcuate keys. In the completely assembled condition of the retainer ring and the arcuate keys, the wall 82 is substantially flush with the first side wall 73 of the arcuate keys 67, 68 and 69. In this completely assembled condition, the second side wall 83 of the retainer ring terminates slightly short of the second side wall 74 of the arcuate keys. In this type of construction, therefore, the arcuate keys are capable of taking an axial load from the right against the first side wall 73 or an axial load from the left against the second side wall 74. In the not completely assembled condition, the side wall 82 extends slightly to the right of the first side wall 73 of the arcuate keys and the thrust member in assembly exerts a relatively low force against the retainer ring necessary to move the same into the position shown in FIGURE 7. This force in moving the retainer ring into this position exerts a compressive force against the keys tending to hold them in the groove. The retainer ring as a result of this exerts an equal and opposite force against the thrust member acting as a pre-load. It should be readily appreciated by those skilled in the art that the construction shown in FIGURES 5 and 6 for the outside of a shaft may also be readily incorporated into an internal shaft collar assembly such as is shown in FIGURES 7 and 8 of the drawings.

Figure 9:
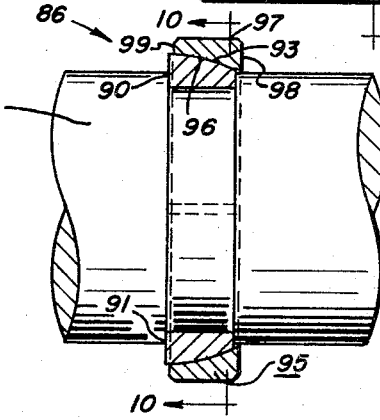
FIGURE 9 is a side elevational view of a shaft collar assembly illustrating a modification of the invention.
Figure 10:
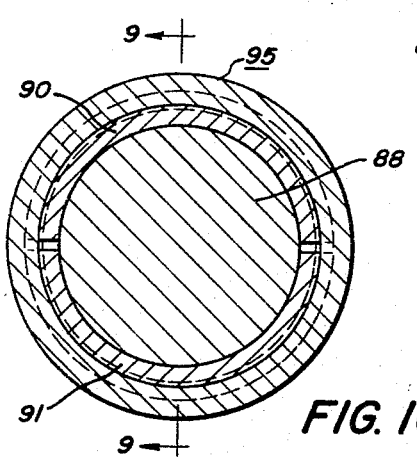
FIGURE 10 is a view taken along the line 10—10 of FIGURE 9.

FIGURES 9 and 10 illustrate a variation in the constructions which have been shown hereinabove. In this construction a shaft collar assembly 86 has been illustrated and is shown in combination with a groove which is provided on a shaft 88 much in the same manner as shown in FIGURES 2 through 6. In this construction two arcuate keys 90 and 91 respectively are positioned in the groove on the shaft, and the outer wall surface 93 of each of the arcuate keys form at least a portion of the surface of a sphere. An annular retainer ring 95 is provided which has an inner wall 96 which generally corresponds to the outer wall surface 93 and is also provided with an outer wall 97 and first and second side walls 98 and 99 respectively. It will be noted in this construction that the first side wall 98 extends to the right of the corresponding wall on the arcuate keys 90 and 91. It will also be noted that the second side wall 99 terminates short of the corresponding wall on the arcuate keys 90 and 91. The side wall 98 as distinguished from the construction shown in FIGURES 1 through 8 is a side wall to be engaged by the thrust member. When used in this manner, the shaft collar assembly is for low axial thrust applications and is not designed to deal with high thrust forces as the designs shown in FIGURES 1 through 8. This particular construction enables the retainer ring 95 to adjust slightly on the arcuate keys so as to make the first side wall 98 flush with the thrust member. This makes up for inaccuracies in the squareness of the wall of the thrust member as it engages the retainer ring 95. It will be noted that the right wall of the retainer ring is the only surface which is available for engagement with the thrust member. The thrust member may, however, be placed to the left as seen in FIGURE 8 of the assembly and in this instance it would be designed for engagement with the left wall of the key members 90 and 91. With this type of construction, the assembly could be used for high axial thrust applications because the force would be taken by the left wall of the arcuate keys rather than by any part of the retainer ring. It will also be appreciated that the construction shown in FIGURES 9 and 10 might be adaptable as an internal shaft collar assembly as described in more detail in conjunction with FIGURES 7 and 8.

As a result of the above constructions which have been described in conjunction with FIGURES 1 through 10, it should be readily appreciated by those skilled in the art that the objects set forth in the initial portion of the specification are carried out and a valuable contribution has been made to the prior art.

Figure 11:
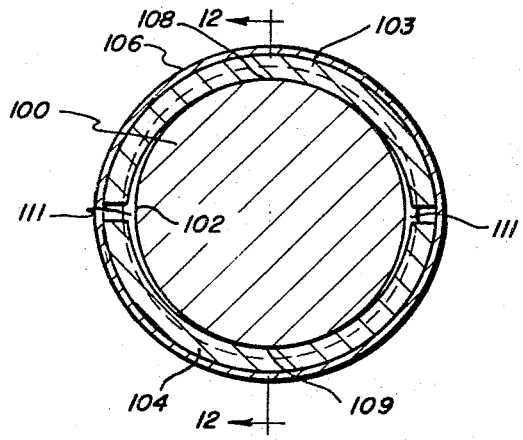
FIGURE 11 is a cross sectional view taken generally along the line 11—11 of FIGURE 12.
Figure 12:
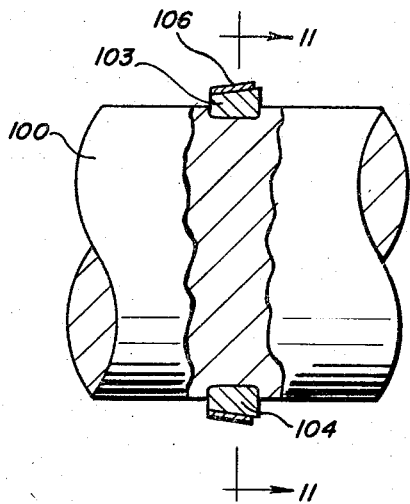
FIGURE 12 is a side elevational view of the shaft collar assembly shown in FIGURE 11.

FIGURES 11 and 12 have been shown for the purpose of illustrating the resilient compensating effect of the retainer of the present invention. FIGURES 11 and 12 illustrate a shaft 100 having a rectangularly shaped angular groove 102 cut therein. Positioned in the groove are first and second arcuate keys 103 and 104, respectively, and a conical shaped resilient retainer 106 fits over the keys in a manner similar to that illustrated in the previous drawings. It is technically possible but not practicable to manufacture parts without tolerances and it is common that in ordinary manufacture, the diameter of the groove 102 will be made with a tolerance from the nominal to the minus side and the inside diameter of the arcuate keys 103 and 104 will bear a tolerance to the plus side. This drawing illustrates that with the clearances from the above referred to tolerances, the inner diameter of the arcuate keys and the outer diameter of the groove 102 will touch at points indicated by reference numerals 108 and 109 on what may be referred to as the Y axis. The difference between the diameter of the groove and the diameter of the arcuate keys is the greatest at diametrically opposed points indicated by the reference numeral 111. It is thus seen that the outer surface of the keys assumes an approximately oval (or out of round) shape with substantially the original diameter of the keys across what might be referred to as the X axis and a smaller diameter across the opposite or what might be referred to as the Y axis. It will therefore be apparent that if a rigid retainer is applied to the keys, the true conical inner surface of the retainer will be mated with a composite of two dissimilar cones with their axes displaced and that line contact will be made across the X axis and no contact will be made elsewhere around the circumference or down the conical surface. It would be only by chance that the tolerances would permit a perfect mate of these members. The fact that in these instances the keys would touch the groove of the shaft across the Y axis and the retainer would contact the keys across the X axis which is displaced 90° gives an instability to the assembly which is undesirable.

In the present design in accordance with the teachings of this invention the use of a thin, resilient or non-rigid retainer 106 which deforms to the shape of the outer surface of the keys and presses the keys to the shaft is a major contribution over the prior art. The present retainer is arranged to deform to whatever shape, within reasonable limitations, the outer surface of the keys possess, not only in the oval section across the assembly but in the conical plane parallel to the axis of the shaft as well. The device in FIGURES 11 and 12 therefore attains its compensation by the use of a ductile material for the retainer and with the retainer designed to protrude from the face of the keys in its relaxed position (in other words from the left side of the keys as seen in FIGURE 12) and this results in an elastic deformation of the retainer itself and forces it to assume the shape of the keys as it is pressed into position over the keys much the same as a die conforms to a punch.

Figure 13:
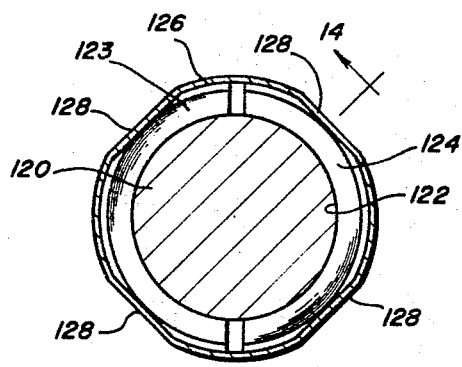
FIGURE 13 is a cross sectional view taken generally along the line 13—13 of FIGURE 14.
Figure 14:
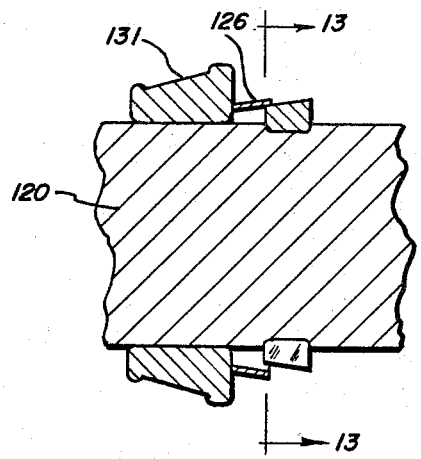
FIGURE 14 is a side elevational view of the shaft collar assembly shown in FIGURE 13 with the same not completely assembled.
Figure 15:
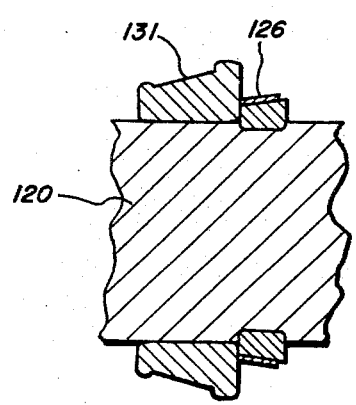
FIGURE 15 is a view similar to FIGURE 14 with the shaft collar assembly completely assembled.

FIGURES 13, 14 and 15 illustrate a slight modification of the design shown in FIGURES 11 and 12. In these figures is shown a shaft 120 with a groove 122 into which fits keys 123 and 124. A conical shaped retainer 126 is provided which has four flutes or flats 128 provided therein. The flats may extend the entire axial length of the retainer. In this design the resilient deformation or compensation for inaccuracies in the tolerances of the groove and/or keys is taken up by the deformation of the flats 128. Although not indicated in these figures, the problem relating to the generally oval shape assumed by the keys and illustarted in FIGURE 11 is present in FIGURE 13. FIGURE 13 has been shown circular merely for ease in drawing the same. The number of flats or flutes may be more or less depending on the situation. FIGURE 14 illustrates the retainer as initially engaging the keys as it would be with no load applied thereto. As the retainer is pressed over the keys to its final assembled position, which is shown in FIGURE 15, the flat portions will deform to take the shape of the circular keys (which are, because of the tolerances mentioned, slightly oval) and will approach circularity in its final position. As the thrust member, here shown as the inner race 131 of a tapered roller bearing, is pressed into position, the retainer will be advanced over the keys to its final position shown in FIGURE 15. There is a bending stress at the point of connection between the flats and the circular portion of the retainer tending to force the retainer to the above referred to approximate circular shape. Because of the arrangement, the force required to complete the assembly of the retainer is quite low as compared to the thrust rating of the assembly. It is also lower than the force required for the conventional press fit of the bearing inner race over the shaft. The parts in FIGURES 11 through 15 have been drawn substantially to scale and for the sake of example, while the thrust rating of the collar assembly might be in the range of from 15,000 pounds to 20,000 pounds, the force required to effect assembly of the retainer might be in the range of from 10 to 50 pounds.

In the final assembled state, the retainer is forced over the keys until the thrust member contacts the keys in both FIGURES 12 and 14. In this assembled position, the thrust load is taken directly against the keys and the retainer because of the aforementioned deformation, is applying a compressive load to the keys keeping them securely engaged with the groove of the shaft. It should be noted that the compressive load just mentioned which serves to hold the keys to the shaft by way of the groove, occurs prior to the thrust member contacting the keys. For the sake of example only, for the diameter of a retainer shown in FIGURES 11 and 13 the thickness of the material of the retainer might be on the order of 29 thousandths of an inch and is of preferably a low carbon steel but could be made of many other materials. If, for example, the tolerance accumulation referred to in the discussion of FIGURE 11 is on the order of 10 thousandths of an inch, the deformation of which the retainer of FIGURES 11 and 13 is capable of readily compensating for this tolerance accumulation by the referred to resilient construction. These advantages are not obtainable by what may be referred to as rigid retainers which have been used in the prior art. It is recognized that the use of the terms resilient and elastic are relative terms, however, within the teachings of the present invention it is believed that these terms are adequately differentiated over what is commercially undersood as being rigid.

In summarizing it may be said that the assemblies described enable the thrust load to be taken directly against the keys and normal commercial tolerances may be applied to the various components with compensation for these tolerances incorporated in the retainer construction. The use of an elastic or resilient retainer will apply a compressive load to the keys, engaging them securely to the shaft with the compressive load applied prior to the major thrust load against the keys. The combination of elements just disclosed permits assembly of the retainer with a relatively light load compared to the thrust rating of the assembly itself.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A locking collar assembly for use with a thrust member and a shaft having wall means defining a substantially circular groove having a first radius and extending annularly around the shaft; including in combination at least first and second arcuate keys, each said first and second arcuate keys having an outer wall and first and second side walls, each said first and second arcuate keys having an inner wall with a second radius which is larger than said first radius, said inner wall of said first and second arcuate keys engaging said circular groove, with said outer walls of said first and second arcuate keys forming an out of round surface with respect to the axis of the shaft, said first and second side walls of said first and second arcuate keys extending from said groove beyond the surface of the shaft, an integral resilient deformable annular retainer ring having inner and outer walls and first and second side walls, said retainer ring having a thickness which is substantially less than the thickness of said arcuate keys, said retainer ring inner wall resiliently deforming to engage substantially all of said out of round outer walls of said first and second arcuate keys to hold the same assembled in said groove, said retainer ring first side wall extending to said first side wall of said first and second arcuate keys and said retainer ring second side wall terminating short of and adjacent said second side wall of said first and second arcuate keys in assembled condition whereby an axial force may be exerted on said arcuate keys in either direction, said retainer ring inner wall covering substantially all said outer wall of said first and second arcuate keys, and said second side wall of said first and second arcuate keys which extends beyond the surface of the shaft being uncovered.

2. A locking collar assembly for use with a thrust member and a shaft having wall means defining a substantially circular groove having a first radius and extending annularly around the shaft; including in combination at least first and second arcuate keys, each said first and second arcuate keys having an outer wall and first and second side walls, each said first and second arcuate keys having an inner wall with a second radius which is larger than said first radius, said inner wall of said first and second arcuate keys engaging said circular groove with said outer walls of said first and second arcuate keys forming an out of round with respect to the axis of the shaft and generally conical surface, said first and second side walls of said first and second arcuate keys extending from said groove beyond the surface of the shaft, an integral resilient deformable annular retainer ring having inner and outer walls and first and second side walls, said retainer ring having a thickness which is substantially less than the thickness of said arcuate keys, said retainer ring inner wall being generally conical in shape and having flat portions which are resiliently deformable to engage said out of round outer walls of said first and second arcuate keys to hold the same assembled in said groove, said retainer ring first side wall extending to said first side wall of said first and second arcuate keys and said retainer ring second side wall terminating short of and adjacent said second side wall of said first and second arcuate keys in assembled condition whereby an axial force may be exerted on said arcuate keys in either direction, said retainer ring inner wall covering substantially all said outer wall of said first and second arcuate keys, and said second side wall of said first and second arcuate keys which extends beyond the surface of the shaft being uncovered.

3. A locking collar assembly for use with a thrust member and a shaft having wall means defining a substantially circular groove having a first radius and extending annularly around the shaft; including in combination at least first and second arcuate keys, each said first and second arcuate keys having an outer wall and first and second side walls, each said first and second arcuate keys having an inner wall with a second radius which is larger than said first radius, said inner wall of said first and second arcuate keys engaging said circular groove with said outer walls of said first and second arcuate keys forming an out of round generally conical surface with respect to the axis of the shaft, said first and second side walls of said first and second arcuate keys extending from said groove beyond the surface of the shaft, an integral resilient deformable annular retainer ring having inner and outer walls and first and second side walls, said retainer ring having a thickness which is substantially less than the thickness of said arcuate keys, said retainer ring inner wall forming a generally true conical surface prior to assembly and resiliently deforming to engage said out of round outer walls of said first and second arcuate keys to hold the same assembled in said groove, said retainer ring first side wall extending to said first side wall of said first and second arcuate keys and said retainer ring second side wall terminating short of and adjacent said second side wall of said first and second arcuate keys in assembled condition whereby an axial force may be exerted on said arcuate keys in either direction, said retainer ring inner wall covering substantially all said outer wall of said first and second arcuate keys, and said second side wall of said first and second arcuate keys which extends beyond the surface of the shaft being uncovered.

References Cited

UNITED STATES PATENTS

| | | | |
|---|---|---|---|
| 1,776,747 | 9/1930 | Bantin | 308—236 X |
| 1,779,204 | 10/1930 | Anderson | 287—52.03 |
| 2,516,472 | 7/1950 | MacKeage | 287—130 |
| 2,897,022 | 7/1959 | Marola | 287—53 X |
| 3,101,962 | 8/1963 | Nunlist | 287—114 |

FOREIGN PATENTS

| | | |
|---|---|---|
| 83,719 | 10/1957 | Denmark. |
| 777,023 | 6/1957 | Great Britain. |

CARL W. TOMLIN, *Primary Examiner.*

D. W. AROLA, T. A. LISLE, *Assistant Examiners.*